United States Patent [19]
Profé

[11] Patent Number: 5,714,171
[45] Date of Patent: Feb. 3, 1998

[54] APPARATUS FOR DRAWING FILAMENTS

[75] Inventor: Hans Jürgen Profé, Bobingen, Germany

[73] Assignee: Hoechst Aktiengesellschaft, Germany

[21] Appl. No.: 671,118

[22] Filed: Jun. 24, 1996

Related U.S. Application Data

[62] Division of Ser. No. 408,068, Mar. 21, 1995, Pat. No. 5,599,488.

[30] Foreign Application Priority Data

Mar. 23, 1994 [DE] Germany .................. 44 09 940.1

[51] Int. Cl.⁶ ................................................ B29C 47/92
[52] U.S. Cl. ................ 425/66; 264/555; 425/72.2; 425/192 S
[58] Field of Search ............... 425/66, 72.2, 192 S, 425/378.2; 264/518, 555

[56] References Cited

U.S. PATENT DOCUMENTS

| | | | |
|---|---|---|---|
| 2,697,251 | 12/1954 | Bauer | 425/72.2 |
| 3,291,880 | 12/1966 | Pitzl | 425/72.2 |
| 3,436,792 | 4/1969 | Hench | 425/72.2 |
| 3,655,862 | 4/1972 | Dorschner et al. | 264/555 |
| 3,707,593 | 12/1972 | Fukada et al. | 425/66 |
| 3,802,817 | 4/1974 | Matsuki et al. | 425/66 |
| 4,017,580 | 4/1977 | Barbey | 425/66 |
| 4,340,563 | 7/1982 | Appel et al. | 425/66 |
| 4,627,811 | 12/1986 | Greiser et al. | 425/72.2 |
| 4,692,106 | 9/1987 | Grabowski et al. | 425/66 |
| 4,812,112 | 3/1989 | Balk | 425/66 |
| 4,838,774 | 6/1989 | Balk | 425/66 |
| 4,997,611 | 3/1991 | Hartmann | 425/72.2 |

FOREIGN PATENT DOCUMENTS

2-182909  7/1990  Japan ........................ 264/40.3

*Primary Examiner*—Jay H. Woo
*Assistant Examiner*—Iurie A. Schwartz
*Attorney, Agent, or Firm*—Connolly & Hutz

[57] ABSTRACT

Apparatus for drawing filament bundles present in the form of a curtain comprises an injector which is rectangular in horizontal section and which is adjoined by a drawing shaft in the form of two parallel plates. At least one of the plates comprises a plurality of pressure measuring elements arranged in the form of a grid whereby the velocity distribution of the drawing gas in the drawing shaft can be adjusted through local variation of the geometry or the amount of drawing gas in the drawing shaft.

11 Claims, 5 Drawing Sheets

APPARATUS FOR DRAWING FILAMENTS

CROSS-REFERENCE TO RELATED APPLICATION

The present application is a division of application Ser. No. 08/408,068, filed Mar. 21, 1995 now U.S. Pat. No. 5,599,488.

BACKGROUND OF THE INVENTION

The present invention relates to a process for drawing filament bundles, to an apparatus especially adapted therefor, and to the use thereof in the production of spunbonded webs.

The drawing of filament bundles by means of drawing nozzles is known per se. For instance, in the production of spunbonded webs, molten polymer is spun through spinnerets, drawn by means of drawing nozzles through air friction and then laid down on a conveyor belt to form a web. This web is subsequently consolidated and transported out of the plant. Examples of said processes are described in *Vliesstoffe*, eds. J. Lünenschloβ and W. Albrecht, G. Thieme Verlag 1982, pp. 106–108.

It has also already been proposed to produce spunbonded webs by the curtain spinning process. In the curtain spinning process, the spinnerets are arranged in series, so that the filaments are spun in the form of a curtain. The patent literature already contains several proposals for carrying out the curtain spinning process, for example DE-B-2,048,006, DE-C-3,117,7371, DE-A-3,701,531, DE-A-3,713,861 and DE-A-3,401,639.

Furthermore, DE-A-1,785,158 discloses a nozzle with adjoining filament duct, which is used especially in the production of non-woven products from laid-down continuous filaments. Embodiments are described of these nozzles which can be used in curtain spinning. However, such constructions have hitherto not been used in practice. One of the reasons for this is the hitherto inadequate control of the uniformity of the drawing conditions.

It has further also already been proposed to make drawing nozzle shaft walls deformable in order that different drawing conditions may be established in this way. DE-A-3,503,818 describes such an apparatus wherein the drawing shaft walls consist of a deformable material which in operation allows a deformation of the drawing shaft walls in the manner of a Venturi nozzle and which are deformable in a predetermined manner by means of adjusting drives. In said previously known nozzle, the entire draw takes place within a relatively confined region in the Venturi nozzle.

SUMMARY OF THE INVENTION

In the drawing of filaments it is desirable to create very high and uniform drawing conditions for each filament. The present invention provides a process and apparatus for a high and particularly uniform drawing of sets of filaments.

The present invention provides a process for drawing curtain filament bundles comprising the steps of:

a) introducing the filament bundles together with aspirated gas into an injector which is rectangular in horizontal section and partially drawing the filament bundles in the injector b) fully drawing the filament bundles in a drawing shaft which adjoins the injector and consists of two parallel and close-distance plates, c) monitoring the pressure profile in the drawing shaft with a plurality of pressure measuring device arranged in the form of a grid, and d) setting a desired pressure profile in the drawing shaft by local variation of the geometry and/or the amount of drawing gas in the drawing shaft.

BRIEF DESCRIPTION OF THE DRAWING

Novel features and advantages of the present invention will become apparent to those skilled in the art from the reading of the following detailed description in conjunction with the accompanying drawing wherein.

In the process of the present invention, part of the drawing takes place in the injector (2) and the remainder in the drawing shaft (4). The drawing in question is of the pneumatic type, based on the gas friction due to the difference in speed between the drawing gas, usually air, and the filament. The injector (2) is constructed in such a way as to create a high gas speed, producing a partial drawing of the filament.

In a preferred embodiment of the invention, said injector (2) has a parallelepipedal shape in vertical section.

In a particularly preferred embodiment of the present invention, said injector (2) has a diffusor which connects said injector (2) to said drawing shaft (4).

The dimensioning of the injector (2) and of the drawing shaft (4) and the operating conditions, such as the pressure of the propellent gas, is to be chosen in a particular case in such a way that the required total draw is effected in the two parts of the apparatus.

To achieve uniform drawing conditions for all filaments, it is necessary that the drawing gas and the filaments, for pneumatic drawing, be passed through the drawing shaft (4) between two spaced apart surfaces.

Typical dimensions for the plates (5) are from 1 to 10 m for the width and from 1 to 3 m for the height. The distance between the plates is usually within the range from 5 to 15 mm, preferably from 8 to 15 mm. This distance should be maintained in such a way in all surface regions that uniform drawing of the individual filaments of the curtain is achieved.

Uniform drawing of the individual filaments of the curtain presupposes a very uniform speed distribution of the drawing gas.

The present invention proposes using the back pressure in the drawing shaft (4) as a measure of the speed distribution of the drawing gas, and setting this speed distribution through local variation of the geometry and/or the drawing gas quantity. In the gap between the two plates (5), the back pressure decreases linearly, in the direction of the exit, down to ambient pressure. If, for example, the plates are installed at a nominal distance of 10 mm and air flows through this gap at a speed of 120 m/sec, a pressure loss of about 600 mbar will result over a length of 2.5 m.

In the ideal case, the decrease in the pressure to ambient from the point of entry into the gap to the point of exit therefrom will be exactly linear. Viewed in the transverse direction, the pressures must in the ideal case always be exactly equal in magnitude, based on the same filament flow length.

The pressure profile in the drawing shaft (4) is monitored according to the present invention by a plurality of pressure measuring means (6) arranged in the form of a grid. In this way the pressure profile can be controlled in and perpendicularly to the flow direction of the gas.

The pressure monitoring is customarily effected by means of a grid system of longitudinal and transverse coordinates. This makes the production of a pressure grid possible. Typical dimensions of the grid comprise a grid division of 10 cm; that is, 100 measuring sites/m$^2$.

As mentioned above, the setting of the desired pressure profile, i.e. the desired speed distribution for the drawing gas in the drawing shaft (4), is effected through local variation of the geometry and/or the drawing gas quantity in the drawing shaft (4).

The local variation in the amount of drawing gas in the drawing shaft (4) can be effected by specific local supply and removal of a regulating gas, if necessary by said regulating gas preferably being passed locally into or out of said drawing shaft (4) through individually operable regulating gas lines (30) arranged in the form of a grid on at least one of said plates (5) of said drawing shaft (4). The supply and removal of the regulating gas can be effected by one and the same regulating gas line or there are separately arranged regulating gas supply lines and regulating gas removal lines.

In a particularly preferred embodiment of the present invention, the setting of the desired pressure profile in said drawing shaft (4) is effected by local deformation of at least one of said plates (5) By means of adjusters (7) which are individually adjustable and arranged in the form of a grid.

The setting of the desired pressure profile in the drawing shaft (4) can also Be carried out through a combination of the above-described measures.

If the back pressure determined in a specific case at a certain location differs from the target value, it can be brought back on target through localized deformation of at least one of the plates (5) By means of adjusters (7) located at this location or in its vicinity. The grid of pressure measuring means (6) is thus assigned a grid of adjusters (7). The localized deformation alters the distance between the plates (5) at this location and hence the velocity of flow through the gap, which in turn affects the magnitude of the Back pressure at this location. The same is true, for regulation by means of supply and removal of regulating gas.

If, in relation to the target value, the back pressure is found to be too high (low), then the flow velocity of the gas is too low (high) and consequently the gap is too wide (narrow) or the drawing gas throughput at this location is too low (high).

The pressure measuring means (6) can be pressure sensors. The pressure sensors used can be any devices suitable for this purpose, as long as they do not impair the transportation of the filaments in the drawing shaft (4).

The measuring heads of the pressure sensors can end directly in the drawing shaft (4).

In a particularly preferred embodiment, the static pressure is measured at the relevant location in the drawing shaft (4). For this purpose, the drawing shaft (4) contains at the relevant locations holes (13), preferably in the diameter range from 0.5 to 1.2 mm, which in each case end in a sealed-off space (12) in which there is a build-up to a static pressure which corresponds to the pressure at the relevant location in the drawing shaft. Pressure measurement takes place in this measuring space, for example by means of a pressure sensor whose measuring head is mounted in the wall of the measuring space or preferably is connected thereto via a flexible tube line (17).

In a preferred embodiment of the process of the present invention, the pressure measurement values of said plurality of pressure measuring means (6) are retrieved sequentially.

This is customarily done by means of a selector switch whereby the individual pressure measuring means (6) are polled in succession.

The selector switch can be any device suitable for this purpose, for example an electronic circuit which polls individual pressure measuring means (6) in succession, in which case this polling can be automated or else be done manually however, it can also be a mechanical circuit, for example a step switch.

The selector switch is preferably a pneumatic step switch. An example is a pneumatic step switch from Samsomatic. This pneumatic step switch is connected with a plurality of pressure measuring means (6) via flexible tube lines (17) to a pressure sensor.

In a particularly preferred embodiment of the process of the present invention, the pressure measurement values of various pressure measuring means (6) are fed in succession to a measurement value transformer and optionally displayed and the transformed pressure measurement value is used for regulating the pressure at or in the vicinity of the relevant pressure measuring means (6). For this purpose, the measured pressure value at the relevant location is compared with a predetermined target value and, if found to exceed or undershoot a predetermined range, is regulated back into said range through variation of the distance between said plates (5) by means of one or more adjusters (7) situated on or in the vicinity of said pressure measuring means (6) and/or through variation of the amount of drawing gas flowing through said drawing shaft (4) by means of supply or removal of part of said drawing gas through one or more regulating gas lines situated on or in the vicinity of said pressure measuring means (6).

Preferably, the setting of a desired pressure profile in said drawing shaft (4) is effected by locally bending a bendable metal sheet making up one of said plates (5) in or out. Said plates (5) can also consist of other deformable materials, for example plastic.

Particularly preferably, one of the plates (5a) is constructed to be exactly planar. This can be done through choice of a suitable material, of a suitable wall thickness and preferably from a metal sheet equipped with a surface-stabilizing lattice frame. The other plate (5b) is bendable in gridlike sections.

In a preferred embodiment, the grids of the pressure measuring means (6) and of the adjusters (7) are located in the bendable plate (5b), both grids being arranged in the shape of a rectangle, square, triangle or diamond. Advantageously, in each case one pressure measuring means (6) and one adjuster (7) and/or regulating gas line alternate. This applies to the longitudinal and the transverse direction of the plate.

In a particularly preferred embodiment, the grids of said pressure measuring means (6) and of said adjusters (7) are located in said plates (5a) and (5b), each pressure measuring means having an adjuster opposite.

The adjuster can be any desired device capable of altering the distance between the plates in a predetermined manner. The devices can be automatic or manual. Examples are hydraulically, pneumatically, electromechanically or magnetically operated adjusters.

In a preferred embodiment, the adjusters (7) are adjusting bolts with which the plate can be bent positively or negatively at the desired location.

The process described can be used to produce in particular spunbonded webs, very particularly preferably spunbonded webs in synthetic polymers, such as polyesters, especially polyethylene terephthalate.

The invention also comprises a process for producing spunbonded webs wherein:
i) a spinnable material is extruded from rows of spinnerets to form a set of filaments (1) in the form of a curtain, ii) said set is consolidated in a cooling zone arranged underneath said spinnerets with or without quenching of said filaments, iii) said set is subjected underneath said cooling zone to a drawing as defined above, the pressure profile in said drawing shaft (4) being set in such a way that the decrease in the back pressure in said drawing shaft (4) is linear in the filament transport direction and constant perpendicularly to the filament transport port direction, and iv) the drawn filaments are laid down on a transport port device (19) to form a primary textile sheet material.

The present invention further provides an apparatus for drawing filament bundles (1) present in the form of a curtain, comprising an injector (2) which is rectangular in horizontal section and which is adjoined by a drawing shaft (4) in the form of two parallel plates (5), at least one of said plates (5) comprising a plurality of pressure measuring means (6) arranged in the form of a grid and/or devices whereby the velocity distribution of the drawing gas in said drawing shaft (4) can be adjusted through local variation of the geometry and/or of the amount of drawing gas in said drawing shaft (4).

In a preferred embodiment, at least one of said plates (5) of said drawing shaft (4) comprises a plurality of regulating gas lines arranged in the form of a grid.

In a particularly preferred embodiment, at least one of said plates (5) of said drawing shaft (4) comprises a plurality of adjusters (7) arranged in the form of a grid by means of which said plate (5) is deformable in places.

In a further particularly preferred embodiment, the invention provides an apparatus equipped with an intake insert (8) which possesses an intake slot (9) to accommodate said filament bundle (1) and which ends in a gas mixing chamber (10) which is equipped with at least one gas supply line (11).

The gas mixing chamber (10) is supplied with propellent gas through one or more gas supply lines (11). The gas supply to the gas mixing chamber (10) can be through any desired nozzles disposed downstream of the gas supply line (11), preferably via Laval nozzles.

Figure 1:
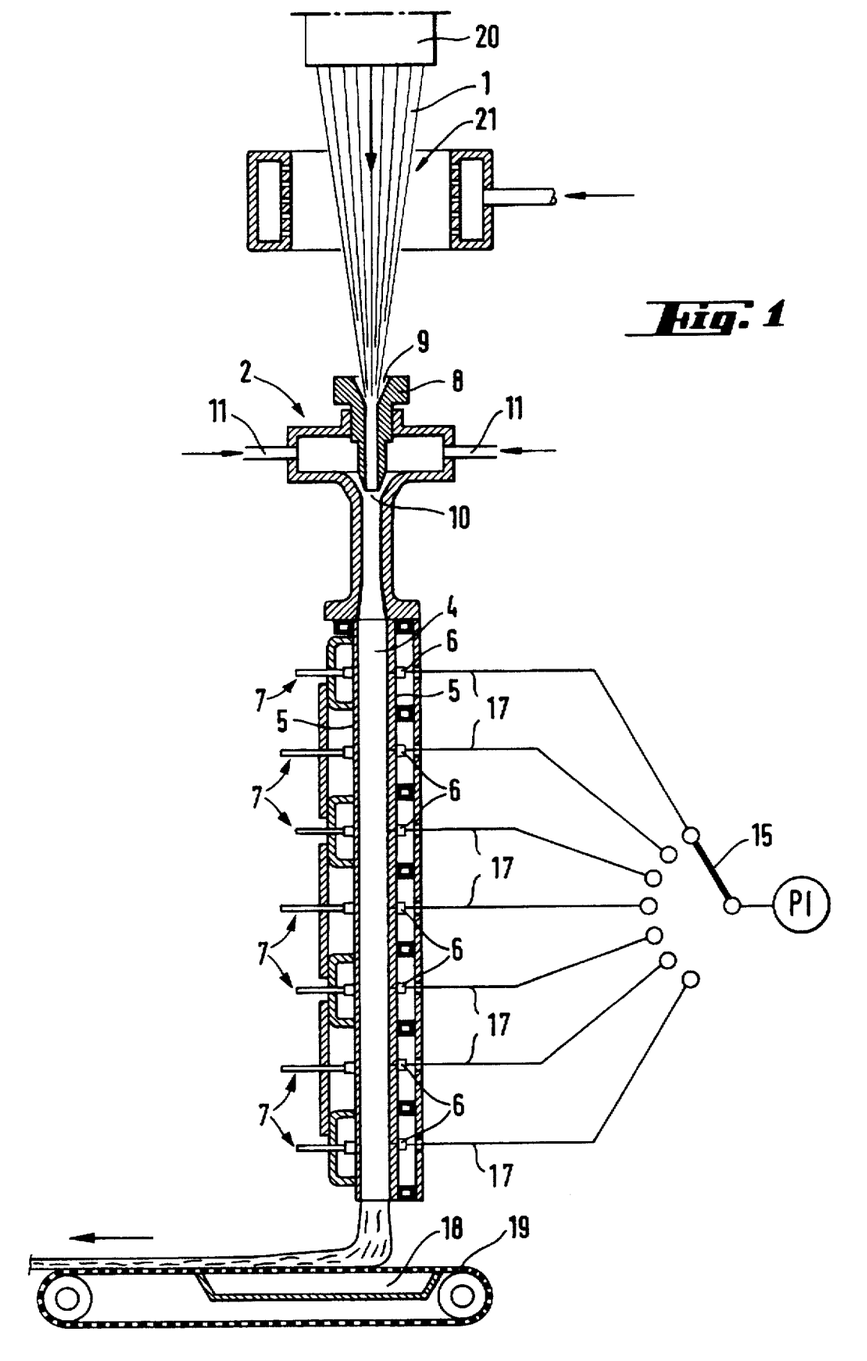
--       Figure 1 is a diagrammatic sectional view illustrating apparatus for drawing filaments, in accordance with the present invention.

FIG. 1 is a longitudinal section through an apparatus for producing a spunbonded web. Spinnable material is forced through spinnerets (20) arranged in rows. They thus produce a set of filaments (1) in the form of a curtain. This curtain of filaments is consolidated in a cooling zone (21) arranged underneath the spinnerets. In the depicted embodiment, the cooling is effected through a transverse quench with air. Underneath the cooling zone (21) the curtain of filaments is subjected to a draw. For this, the filament bundles (1) enter the intake slot (9) of an injector (2) which is supplied with propellent gas via two gas supply lines (11). The propellent gas passes via propellent air slots, preferably Laval nozzles on both sides, into a gas mixing chamber (10).

The injector (2) is followed by a drawing shaft (4) in the form of two parallel plates (5). The length of this drawing shaft (4) is co-determining for the drawing of the individual filaments and is for example 2.5 m. One of the plates (5) comprises a plurality of pressure measuring means (6) arranged in the form of a grid and the other plate (5) comprises a plurality of adjusters (7) arranged in the form of a grid. These adjusters (7) can be used to effect localized deformation of the plate (5), the pressure profile in the drawing shaft (4) being adjusted in such a way that the drop in the back pressure in the drawing shaft (4) is linear in the filament transport direction and constant perpendicularly to the filament transport direction and in the direction of the filament curtain. In the depicted embodiment, the drawing apparatus has an intake insert (8) which receives the filament bundles (1) and which ends via a gas mixing chamber (10) in a drawing shaft (4). The gas mixing chamber (10) is equipped with two gas supply lines (11).

The injector (2) is typically operated with compressed air at 2.5 bar. This pressure gradient is converted into gas velocity to such an extent that the subsequent drawing shaft for example still has available a residual pressure gradient of about 0.5 bar in order that the wall friction in the drawing shaft may be overcome.

The pressure values of the individual pressure measuring means (6) are sequentially retrieved in the depicted embodiment by means of a selector switch (15).

After passing through the drawing apparatus, the drawn filaments are laid down on a transport device (19) to form a primary textile sheet material. This transport device is customarily a perforated belt with an aspirator (18) arranged on its underside in order that the gas entrained by the filaments may be aspirated away and the primary spun-bonded web may be fixed on the perforated belt.

Figure 2:
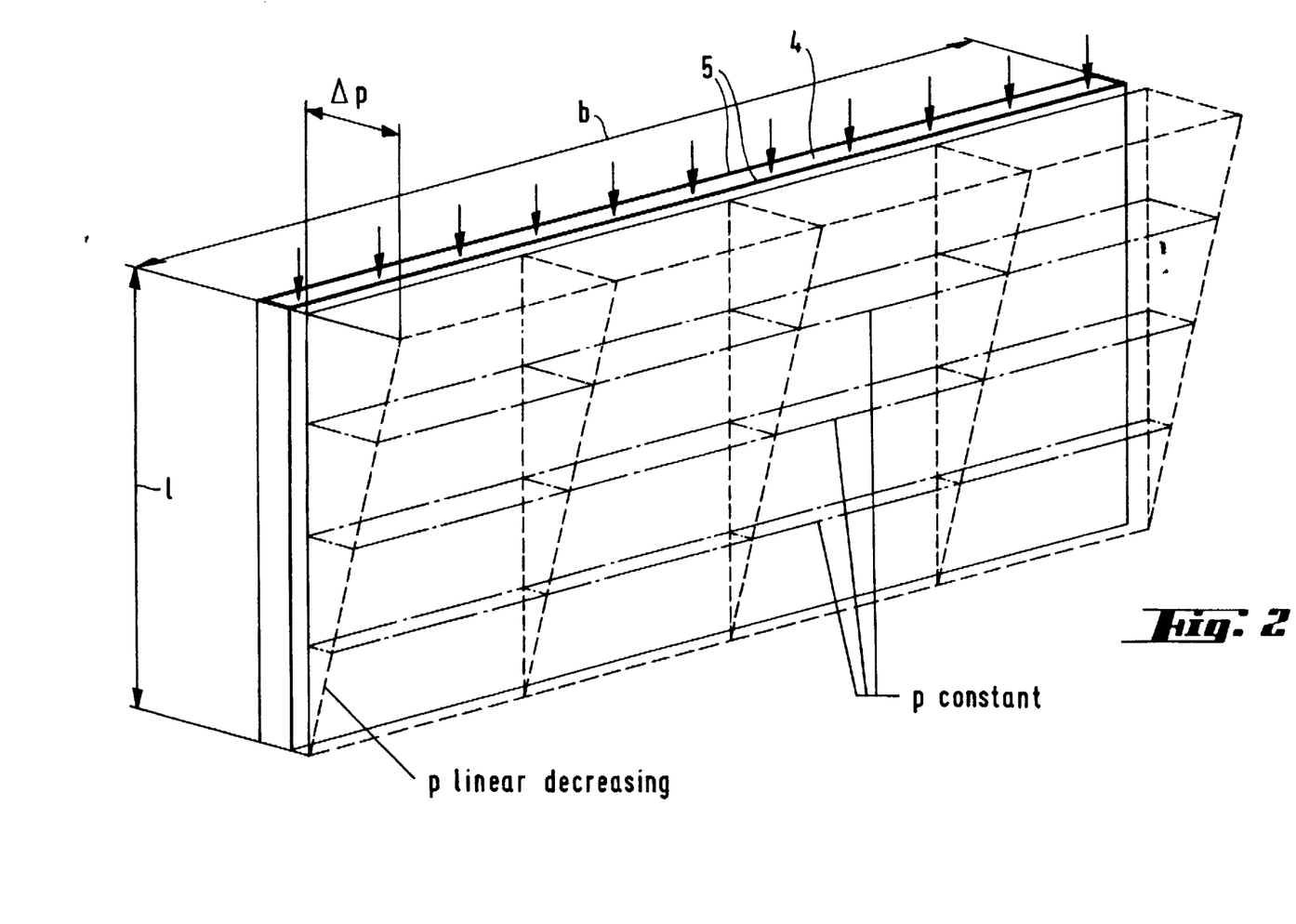
Figure 2 is an illustration of the drawing shaft of the present invention along its entire width diagrammatically illustrating air flow through the shaft.

In the illustration of FIG. 2, air enters the drawing shaft (4) via the entire shaft width. The air friction against the drawing shaft wall is responsible for the build-up in the drawing shaft of a back pressure which, by the point of exit of the air from the shaft, will have decreased to ambient pressure. The desired pressure drop along the flow length should be linear. Viewed in the transverse direction, constant pressure values are desired.

Figure 3:
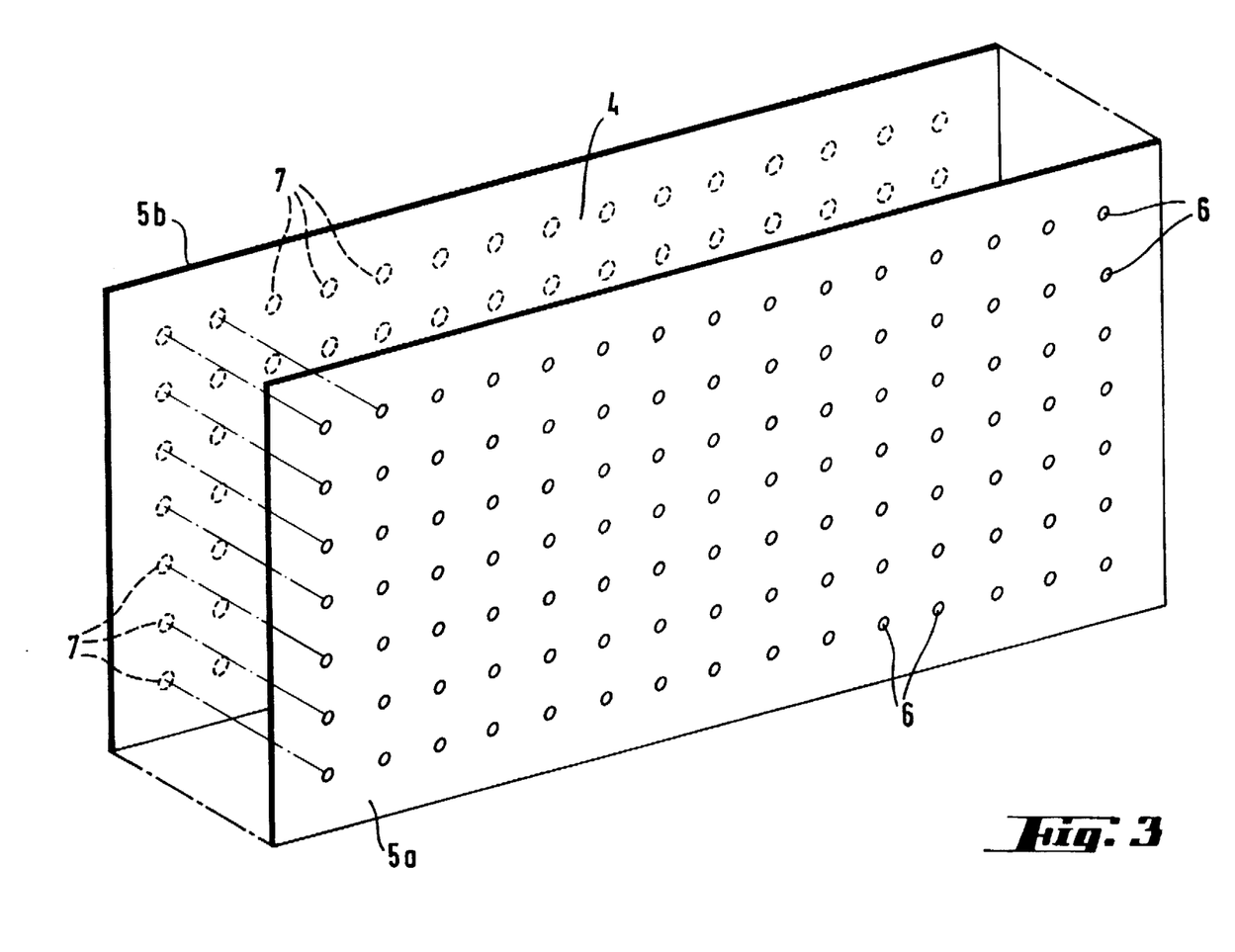
Figure 3 is an illustration diagrammatically showing the drawing shaft and the opposing pressure measuring devices and adjusters in the opposed plates of the shaft.

FIG. 3 illustrates a preferred arrangement of mutually opposite pressure measuring means (6) and adjusters (7) in the plates (5).

Figure 4:
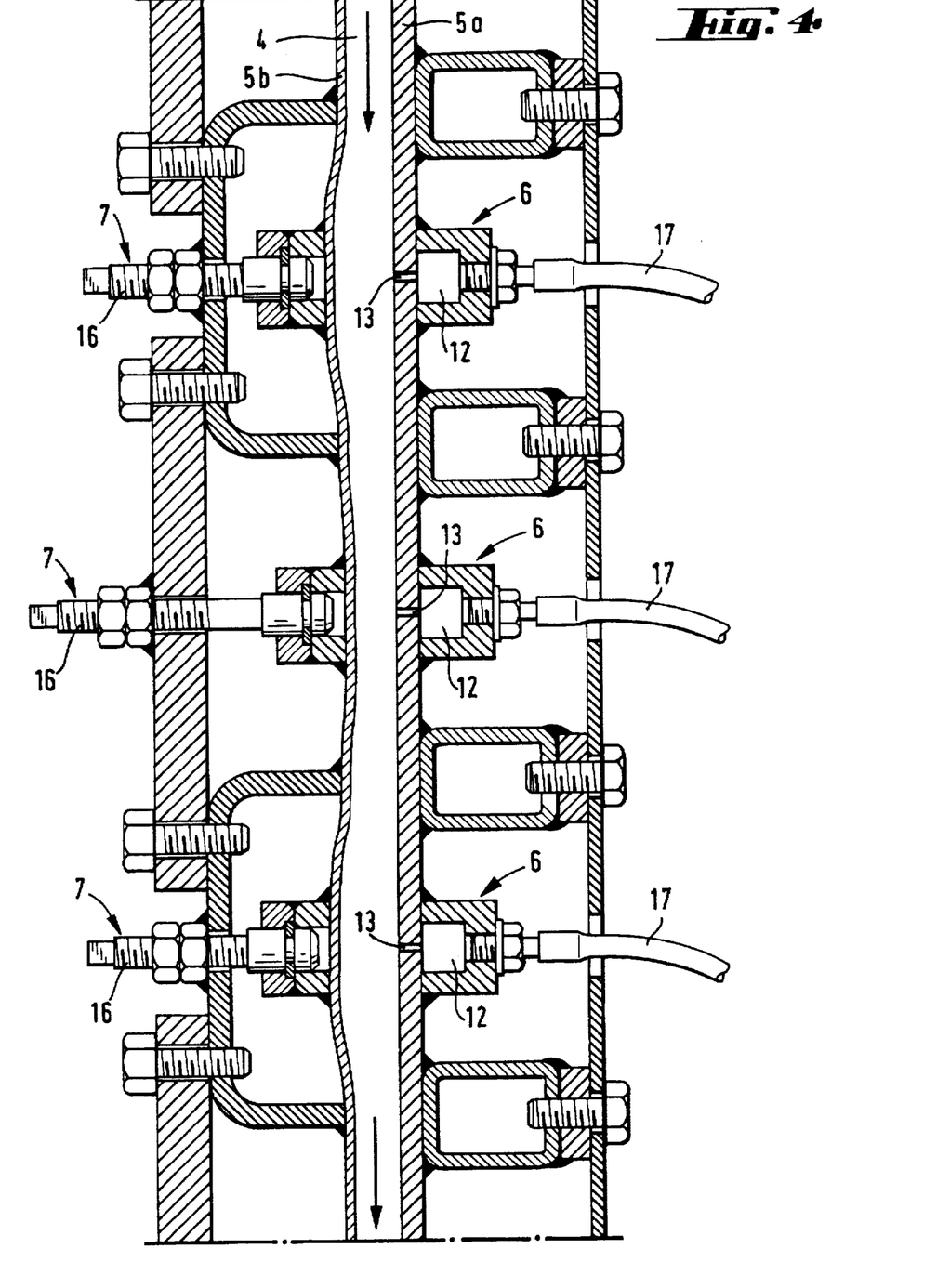
Figure 4 is an enlarged sectional view illustrating the drawing shaft and the opposed measuring devices and adjusters in the plates of the shaft.

FIG. 4 depicts a preferred embodiment of a drawing shaft (4). One of the plates (5a) is constructed to be sheet-stable. This is advantageously done by lightweight construction as customary in aircraft construction. The other plate (5b) consists of bendable sheet metal.

Plate (5a) comprises the grids of the pressure measuring means (6), while plate (5b) comprises the grids of the adjusters (7). In the depicted embodiment, the drawing shaft (4) is equipped with holes (13) which each end in sealed-off measuring spaces (12) in which the pressure is measured by means of a pressure measuring means not depicted which communicates with the sealed-off measuring space (12) via a flexible tube line (17).

The bending of the plate (5b) is effected by means of bolts (16) which act on the sheet metal. Depending on the direction of turn, a positive or negative bend is produced.

Figure 5:
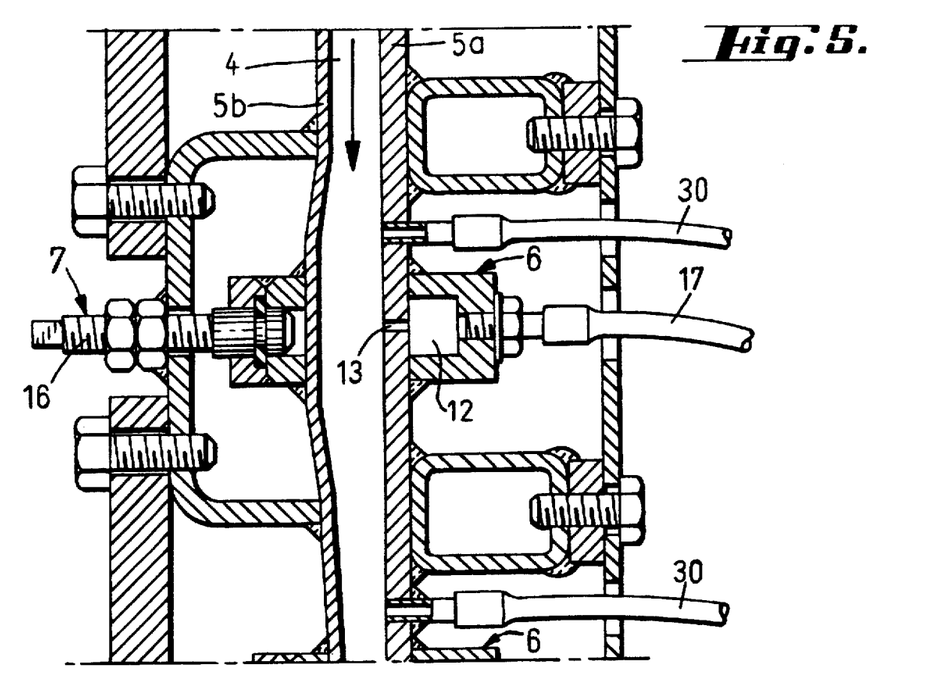
Figure 5 is an enlarged partial sectional view similar to Figure 4, but illustrating several of the pressure regulating lines. --

FIG. 5 illustrates a regulating gas line (30) in the vicinity of each pressure measuring means (6) for the purpose of regulating the pressure in the drawing shaft (2). When the measured pressure is above or below a predetermined target value, regulating gas from gas line (30) passes into or out of drawing shaft (4) to correct the pressure therein.

The devices for adjusting the velocity distribution of the drawing gas in the drawing shaft (4) comprise the adjusters (7) or the gas lines (30). The adjusters change the geometry of the drawing shaft while the gas lines alter the amount of drawing gas in the drawing shaft. A regulating gas line may be provided at each pressure measuring means (6), and the gas lines may be arranged in the form of a grid.

What is claimed is:

1. Apparatus for drawing filament bundles present in the form of a curtain, comprising an injector which is rectangular in horizontal section and which is adjoined by a drawing shaft in the form of two generally parallel plates, at least one of said plates comprising a plurality of pressure measuring means arranged in the form of a grid, and devices for adjusting the velocity distribution of the drawing gas in said drawing shaft through local variation of the geometry of the drawing shaft or of the amount of drawing gas in said shaft.

2. Apparatus as claimed in claim 1 wherein at least one of said plates of said drawing shaft comprises a plurality of regulating gas lines arranged in the form of a grid.

3. Apparatus as claimed in claim 1 wherein at least one of said plates of said drawing shaft comprises a plurality of adjusters arranged in the form of a grid by means of which said plate is deformable in places.

4. Apparatus as claimed in claim 1 wherein said injector has a parallelepipedal shape in vertical section.

5. Apparatus as claimed in claim 1 wherein said injector has a diffusor which connects said injector to said drawing shaft.

6. Apparatus as claimed in claim 1 including an intake insert which possesses an intake slot to accommodate said filament bundle and which ends in a gas mixing chamber which is equipped with at least one gas supply line.

7. Apparatus as claimed in claim 6 wherein the gas supply of said gas mixing chamber is effected through a Laval nozzle downstream of said gas supply line.

8. Apparatus as claimed in claim 1 wherein said drawing shaft has holes which each end in sealed-off measuring spaces in which the pressure is measured by pressure measuring means.

9. Apparatus as claimed in claim 8 including a selector switch, whereby the pressure values of a plurality of sealed-off measuring spaces are retrieved sequentially.

10. Apparatus as claimed in claim 1 wherein the grids of said pressure measuring means are located in one of said plates forming said drawing shaft and the grids of said adjusters are located in the other of the plates forming said drawing shaft, each pressure measuring means of one plate having an opposing adjuster in the opposite plate.

11. Apparatus as claimed in claim 1 including a regulating means which indicates the measured values of the individual pressure measuring means and whereby the measured pressure measurement values of the individual pressure measuring means are compared with a predetermined target value and, if found to exceed or undershoot a predetermined range, are regulated back into said range by means of an adjuster situated in the vicinity of said pressure measuring means being actuated or regulating gas being passed into or out of said drawing shaft via a regulating gas line situated in the vicinity of said pressure measuring means.

* * * * *

UNITED STATES PATENT AND TRADEMARK OFFICE
CERTIFICATE OF CORRECTION

PATENT NO. : 5,714,171
DATED : Feb. 3, 1998
INVENTOR(S) : Hans Jürgen Profé

It is certified that error appears in the above-identified patent and that said Letters Patent is hereby corrected as shown below:

Column 2, line 9, after "wherein:", the following should be inserted:

**Column 3, line 28, "By" should read -- by --; and
       line 34, "Back" should read -- back --.**

UNITED STATES PATENT AND TRADEMARK OFFICE
CERTIFICATE OF CORRECTION

PATENT NO.  : 5,714,171                     Page 2 of 2
DATED       : Feb. 3, 1998
INVENTOR(S) : Hans Jürgen Profé

It is certified that error appears in the above-identified patent and that said Letters Patent is hereby corrected as shown below:

Column 5, line 9, delete "port".

Signed and Sealed this

Nineteenth Day of May, 1998

Attest:

BRUCE LEHMAN

Attesting Officer                 Commissioner of Patents and Trademarks